United States Patent

[11] 3,588,007

[72] Inventor Erwin A. Naumann
Lodi, N.J.
[21] Appl. No. 787,889
[22] Filed Dec. 30, 1968
[45] Patented June 28, 1971
[73] Assignee The Bendix Corporation

[54] FIXED GAIN PASSIVE ADAPTIVE AIRCRAFT CONTROL SYSTEM
11 Claims, 2 Drawing Figs.
[52] U.S. Cl. ................................................ 244/77,
318/18
[51] Int. Cl. ........................................................ B64c 13/18
[50] Field of Search ........................................... 244/77
(G. D), (E, F, M), 77; 318/20.050, 20.211, 20.425, 18

[56] References Cited
UNITED STATES PATENTS
3,051,416  8/1962  Rotier .......................... 244/77(G)
3,057,584  10/1962  Bretoi ........................... 318/20.050X
3,345,018  10/1967  Chanak et al. ................. 244/77(F)
3,399,849  9/1968  Hendrick ....................... 244/77(D)

*Primary Examiner*—Milton Buchler
*Assistant Examiner*—Jeffrey L. Forman
*Attorneys*—Anthony F. Cuoco and Plante, Hartz, Smith & Thompson ABSTRACT: An aircraft control system including a constant high-gain feedback loop for forcing aircraft response to follow a desired response and thereby insuring adequate handling stability over a wide range of flight conditions. Acceleration sensors are located forward of the center of gravity of the craft for sensing angular as well as linear acceleration to permit a higher gain then would otherwise be the case and a filter provides a higher gain in the frequency range of the desired aircraft response to improve system performance without appreciably compromising stability in other frequency ranges.

INVENTOR.
ERWIN A. NAUMANN 3,588,007

1

FIXED GAIN PASSIVE ADAPTIVE AIRCRAFT CONTROL SYSTEM

BACKGROUND OF THE INVENTION

1. Field of the Invention

This invention relates to flight control systems and particularly to systems for controlling an aircraft over a wide range of flight conditions. More particularly, this invention relates to an aircraft control system having stability augmentation means including a constant high-gain feedback loop for forcing response of the craft to follow a desired response.

2. Description of the Prior Art

Most present day high-performance aircraft require stability augmentation systems tolerant of wide variations in flight conditions to bring the handling qualities of the craft to desired specification levels. Prior to the present invention the systems included a computer for computing the high frequency gain of the craft commensurate with changing flight conditions and a variable gain element for changing control loop gain as a function of the computed information. Systems of this kind are termed "active adaptive" systems and are rather complex suffering decreased reliability with the application of redundancy techniques which are a necessary consequence of present day fail-operative flight requirements.

SUMMARY OF THE INVENTION

The device of the present invention is a "passive adaptive" system in that it provides a constant high frequency gain to provide adequate stability over a wide range of flight conditions. A force sensor provides a signal corresponding to the force applied by the pilot to control the craft, and which signal is shaped by a model to provide an output corresponding to the desired response of the craft. The model output is combined with feedback signals corresponding to the actual response of the aircraft, and which feedback signals have been blended in accordance with a predetermined gain. The combined signal is applied to a constant gain device and the gain-adjusted combined signal is applied to a filter which provides a higher gain in the frequency range of the desired response. The output of the filter is applied to a damper servo for providing a corresponding mechanical output, and which mechanical output is combined with the pilot-applied inputs transmitted through a mechanical control system. The combined mechanical output drives a surface actuator which in turn operates an aircraft control surface.

One object of this invention is to provide an aircraft control system including stability augmentation means for controlling an aircraft over a wide range of flight conditions.

Another object of this invention is to provide stability augmentation means including a constant high-gain feedback loop for forcing the response of the craft to follow a desired response.

Another object of this invention is to provide a feedback loop including aircraft acceleration sensors, and wherein said sensors are discretely positioned forward of the center of gravity of the craft for sensing angular as well as linear acceleration to permit a higher feedback loop gain then would otherwise be the case.

Another object of this invention is to provide frequency-shaping means for permitting higher gains in the frequency range of the desired aircraft response without compromising aircraft stability in other frequency ranges.

Another object of this invention is to blend various feedback gains to permit a sufficiently high constant gain for insuring that even at insensitive flight conditions the aircraft response is forced to follow the desired response.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

2

DESCRIPTION OF THE INVENTION

Figure 1:
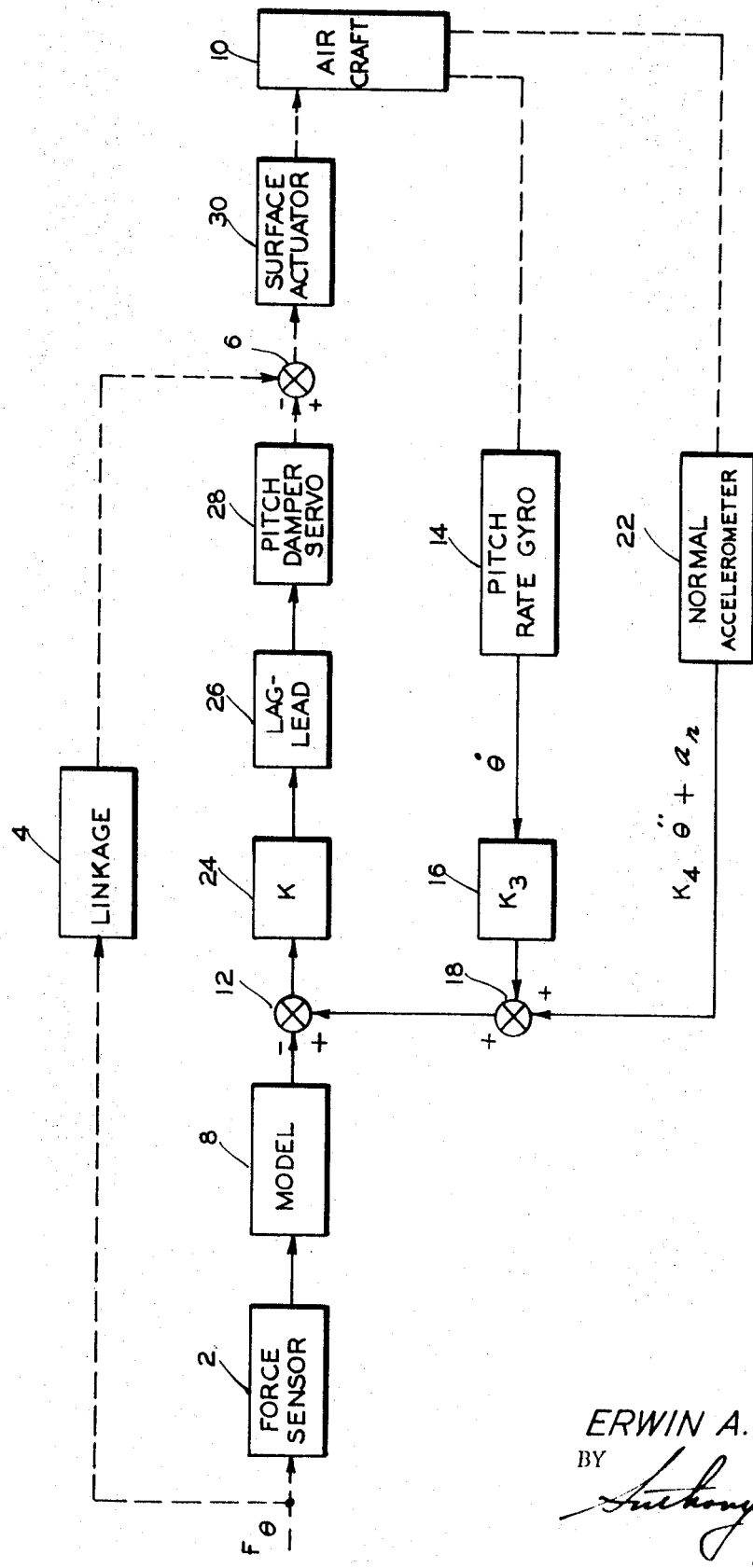
FIG. 1 is a block diagram of a system according to the invention for controlling an aircraft about its pitch axis.

FIG. 1 shows a force sensor 2 for sensing a force $F_\theta$ applied by a human or automatic pilot to control an aircraft 10 about its pitch axis and for providing a signal corresponding to the sensed force. Force $F_\theta$ is applied through suitable mechanical linkage 4 to a mechanical summing means 6.

The signal provided by force sensor 2 is applied to a model 8. Model 8 includes a simple second order filter network and provides a signal corresponding to the desired dynamic response of aircraft 10 about its pitch axis. The signal from model 8 is applied to an electrical summing means 12.

A pitch rate gyro 14 mounted on aircraft 10 provides a signal $\dot\Theta$ corresponding to the pitch rate of the craft. The signal from gyro 14 is applied to a gain device 16 having a predetermined constant gain $K_3$, and which gain device 16 may be a simple fixed-gain amplifier and voltage divider. The signal from gain device 16 is applied to an electrical summing means 18.

A normal accelerometer 22 discretely mounted forward of the center of gravity of aircraft 10 senses angular as well as linear acceleration and provides a corresponding signal having a gain adjustment in accordance with the location of accelerometer 22 relative to the center of gravity of the craft, and which signal is designated as $K_4\dot\Theta+a_n$. The signal from accelerometer 22 is applied to summing means 18 and summed thereby with the signal from gain device 16.

The signal from summing means 18 is applied to summing means 12 and summed thereby with the signal from model 8. The signal from summing means 12 is applied to a gain device 24 having a predetermined constant gain K, and which gain device 24 may be a simple fixed gain amplifier and voltage divider. The signal from gain device 24 is applied to a lag-lead network 26 which shapes the signal for providing higher gain in the frequency range of the desired aircraft response without increasing he gain in other frequency ranges.

The signal from lag-lead network 26 is applied to a pitch-damper servo 28. Pitch-damper servo 28 provides a corresponding mechanical output which is applied to summing means 6 and summed thereby with the mechanical input applied through linkage 4. Summing means 6 provides a combined mechanical output which is applied to a surface actuator 30 for operating a pitch control surface such as the aircraft elevators (not shown) to control aircraft 10 about the pitch axis.

Figure 2:
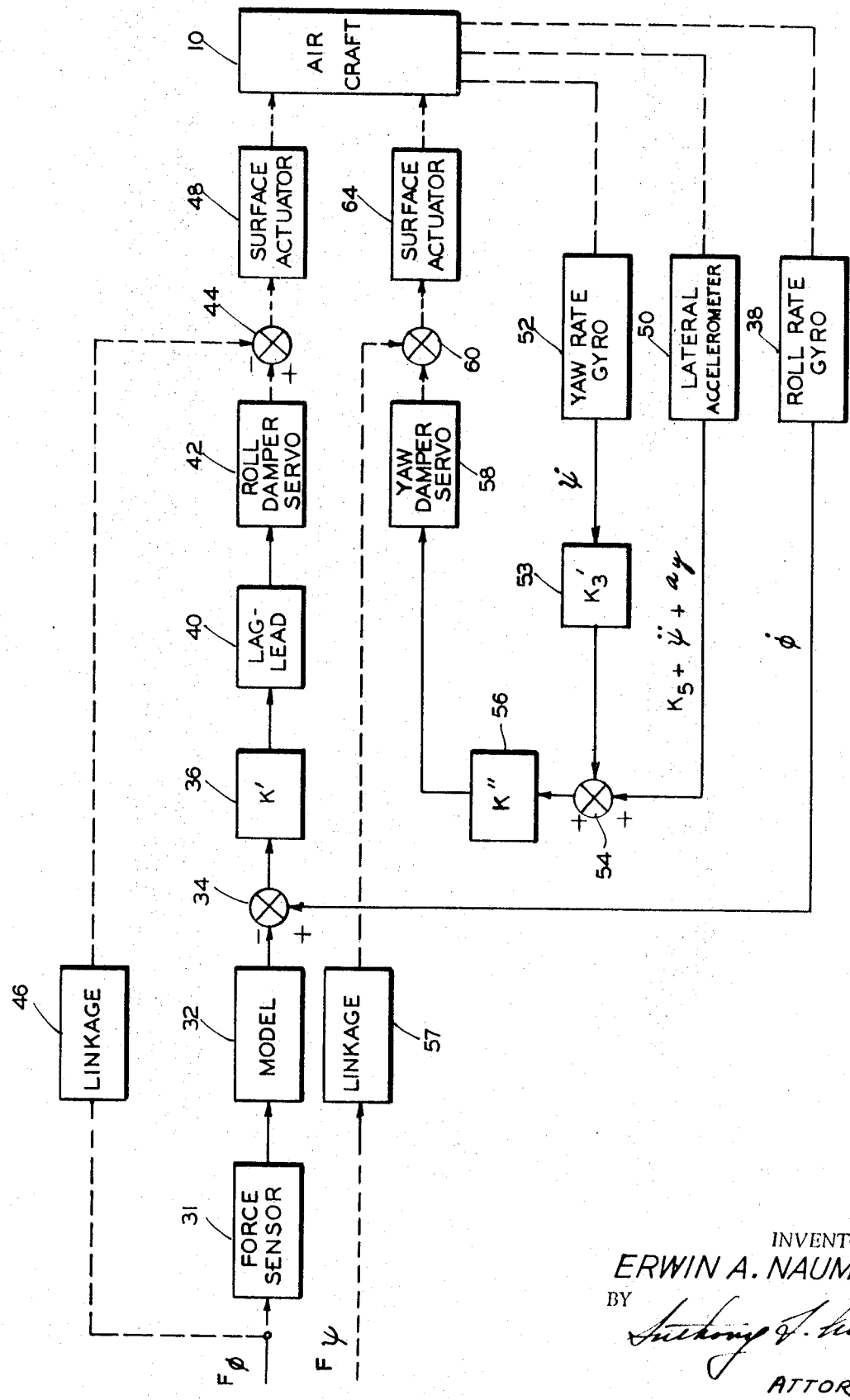
FIG. 2 is a block diagram of the device according to the invention for controlling an aircraft about its roll and yaw axes.

FIG. 2 shows a force sensor 31 for providing a signal corresponding to a force $F_\phi$ exerted by the human or automatic pilot to control aircraft 10 about the roll axis. Force $F_\phi$ is applied through suitable mechanical linkage 46 to a mechanical summing means 44. The signal from force sensor 31 is applied to a model 32. Model 32 includes a first-order filter network and provides a signal corresponding to the desired dynamic response of aircraft 10 about the roll axis. The signal from model 32 is applied to an electrical summing means 34.

A roll rate gyro 38 mounted on aircraft 10 provides a signal $\theta$ corresponding to the roll rate of the craft. The signal from gyro 38 is applied to summing means 34 and summed thereby with the signal from model 32. The summed signal is applied to a gain device 36 having a predetermined constant gain K', and which gain device 36 may be a simple fixed-gain amplifier and voltage divider. The signal from gain device 36 is applied to a lag-lead network 40 which shapes the signal for providing high gain in the frequency range of the desired aircraft response without increasing gain in other frequency ranges.

The signal from lag-lead network 40 is applied to a roll-damper servo 42. Roll-damper servo 42 provides a corresponding mechanical output which is applied to summing means 44 and summed thereby with the mechanical inputs applied through linkage 46. Summing means 44 provides a combined mechanical output which is applied to a surface actuator 48 for operating a roll control surface such as the aircraft ailerons (not shown) to control aircraft 10 about the roll axis.

A lateral accelerometer 50 discretely mounted forward of the center of gravity of aircraft 10 senses angular as well as linear acceleration and provides a corresponding signal having a gain adjustment in accordance with the location of accelerometer 50 relative to the center of gravity of the craft, and which signal is designated as $K_5 \dot{\psi} + a_y$. The signal from accelerometer 50 is applied to a summing means 54.

A yaw-rate gyro 52 mounted on aircraft 10 provides a signal $\dot{\psi}$ corresponding to the yaw rate of the craft. The signal from gyro 52 is applied to a gain device 53 having a predetermined constant gain $K'_3$, and which gain device 53 may be a simple fixed-gain amplifier and voltage divider. The signal from gain device 53 is applied to summing means 54 and summed thereby with the signal from accelerometer 50. The signal from summing means 54 is applied to a gain device 56 having a constant gain $K''$, and which gain device 56 may be a simple fixed-gain amplifier and voltage divider.

The signal from gain device 56 is applied to a yaw-damper servo 58 which provides a corresponding mechanical output, and which output is applied to a mechanical summing means 60 and combined thereby with mechanical inputs applied through linkage 57 when the human or automatic pilot exerts a force $F\Psi$ to control aircraft 10 about its yaw axis. The combined output from summing means 60 is applied to a surface actuator 64 for operating a yaw-control surface such as the aircraft rudder (not shown) to control aircraft 10 about the yaw axis.

OPERATION

The system of the invention provides a high-gain feedback loop to force the response of aircraft 10 (acceleration) to follow a desired response. Unlike the more complex "active adaptive" systems which continuously compute high frequency gain consistent with system stability, the device of the present invention acts in a passive manner and uses a constant high gain throughout the flight of the craft. Thus, the system does not require a complex computer and the variable-gain element of the active system can be replaced by simple amplifiers and voltage dividers. The level of the constant gain is set to provide maximum-feedback loop gain commensurate with stability margins at the most sensitive flight conditions.

In the case of a high-performance supersonic aircraft having a large range of sensitivity, it would seem that a constant-feedback loop gain which insures adequate stability at the most sensitive flight conditions does not provide a sufficiently tight feedback loop at insensitive flight conditions. This is particularly true when the controlled variable is acceleration as in the present case.

If, however, accelerometers 22 and 50 in FIGS. 1 and 2, respectively, are discretely positioned forward of the center of gravity of aircraft 10, angular as well as linear acceleration is sensed. The acceleration signal takes on an anticipatory character to permit a much higher feedback loop gain than would be possible if the accelerometers were located at the aircraft's center of gravity. Hence, even for high performance aircraft, a sufficiently high constant gain can be employed so that at insensitive flight conditions the system performance can be made to satisfy stringent handling specifications.

Lag-lead networks 26 and 40 in FIGS. 1 and 2, respectively, provide higher loop gains in the frequency range of the dynamic response of aircraft 10 without increasing gain in other frequency ranges. Thus, system performance is improved without appreciably compromising stability margins.

The use of lag-lead networks 26 and 40 as described above, together with judicious blending of the various feedback gains, permits the employment of a sufficiently high constant gain so that aircraft response follow desired response even at insensitive flight conditions.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. An aircraft control system comprising:
    means for providing a signal corresponding to the force applied for controlling the craft about a flight axis;
    means connected to the force signal means for shaping the signal therefrom and for providing a signal corresponding to the desired response of the craft;
    means for providing feedback signals corresponding to the actual response of the craft;
    means for combining the desired response signal and the feedback signals;
    means for adjusting the gain of the combined signal by a predetermined constant factor;
    means for filtering the gain-adjusted combined signal for increasing the gain in the frequency range of the desired response of the craft without increasing the gain in other frequency ranges;
    means responsive to the filtered gain-adjusted combined signal for providing a mechanical output corresponding thereto;
    means for providing a mechanical output corresponding to the force applied to control the craft about a flight axis; and
    means responsive to the mechanical outputs for controlling the craft.

2. An aircraft control system as described by claim 1, wherein:
    the first mentioned means provides a signal corresponding to the force applied to control the craft about the pitch axis;
    the means for providing feedback signals corresponding to the actual response of the craft includes a pitch-rate gyro and a normal accelerometer;
    means are provided for adjusting the gain of the signal from the pitch-rate gyro; and
    the normal accelerometer is discretely positioned forward of the center of gravity of the craft for sensing angular as well as linear acceleration and for providing a corresponding signal having a predetermined gain adjustment in accordance with said position.

3. An aircraft control system as described by claim 2, wherein the means responsive to the mechanical outputs for controlling the craft includes:
    means for combining said mechanical outputs; and
    a surface actuator connected to the combining means and to aircraft elevators for actuating the elevators in response to the combined mechanical outputs to control the craft about the pitch axis.

4. An aircraft control system as described by claim 2, including:
    means for combining the gain-adjusted pitch rate signal and the normal acceleration signal corresponding to angular as well as linear acceleration and having a predetermined gain adjustment in accordance with the discrete position of the accelerometer.

5. An aircraft control system described by claim 1, wherein:
    the first mentioned means provides a signal corresponding to the force applied to control the craft about the roll axis; and
    the means for providing feedback signals corresponding to the actual response of the craft includes a roll-rate gyro.

6. An aircraft control system as described by claim 5, wherein the means responsive to the mechanical outputs for controlling the craft includes:
    means for combining said mechanical outputs; and a surface actuator connected to aircraft ailerons for actuating the ailerons in response to the combined mechanical output.

7. An aircraft control system as described by claim 5, including:
- means for providing feedback signals corresponding to the actual response of the craft about the yaw axis;
- means responsive to the feedback signals for providing a mechanical output corresponding thereto;
- means for providing a mechanical output corresponding to the force applied to control the craft about the yaw axis; and
- means responsive to said mechanical outputs for controlling the craft about the yaw axis.

8. An aircraft control system as described by claim 7, wherein:
- the means for providing feedback signals corresponding to the actual response of the craft about the yaw axis includes a yaw-rate gyro and a lateral accelerometer;
- means are provided for adjusting the gain of the signal from the yaw-rate gyro; and
- the lateral accelerometer is discretely positioned forward of the center of gravity of the craft for sensing angular as well as linear acceleration and for providing a corresponding signal having a predetermined gain adjustment in accordance with said position.

9. An aircraft control system as described by claim 8, including:
- means for combining the gain-adjusted yaw-rate signal and the lateral accelerometer signal corresponding to angular as well as linear acceleration and gain adjusted in accordance with the location of the accelerometer.

10. An aircraft control system as described by claim 9, including:
- means for adjusting the gain of the combined signal.

11. An aircraft control system as described by claim 7, wherein:
- the means responsive to said mechanical outputs for controlling the craft about the yaw axis includes:
- means for combining said mechanical outputs; and
- a surface actuator connected to the aircraft rudder for actuating the rudder in response to the combined mechanical output.